United States Patent
Sands et al.

(10) Patent No.: US 10,010,218 B2
(45) Date of Patent: Jul. 3, 2018

(54) AUTOMATED CLEANING OF COOKING APPARATUS

(71) Applicant: Carrier Commercial Refrigeration, Inc., Farmington, CT (US)

(72) Inventors: Jeffrey L. Sands, Freeport, IL (US); Ronald J. Glavan, Rockton, IL (US); Dennis J. Nelson, Rockford, IL (US); Otley D. Freymiller, Deerfield, WI (US)

(73) Assignee: CARRIER COMMERCIAL REFRIGERATION, INC., Farmington, CT (US)

( * ) Notice: Subject to any disclaimer, the term of this patent is extended or adjusted under 35 U.S.C. 154(b) by 15 days.

(21) Appl. No.: 14/776,316

(22) PCT Filed: Mar. 10, 2014

(86) PCT No.: PCT/US2014/022571
§ 371 (c)(1),
(2) Date: Sep. 14, 2015

(87) PCT Pub. No.: WO2014/150206
PCT Pub. Date: Sep. 25, 2014

(65) Prior Publication Data
US 2016/0045068 A1    Feb. 18, 2016

Related U.S. Application Data

(60) Provisional application No. 61/794,766, filed on Mar. 15, 2013.

(51) Int. Cl.
A47J 37/12    (2006.01)
A47J 37/07    (2006.01)
(Continued)

(52) U.S. Cl.
CPC ............. *A47J 37/0786* (2013.01); *A21B 3/16* (2013.01); *A21B 5/02* (2013.01); *A47J 37/0611* (2013.01)

(58) Field of Classification Search
CPC .......... A21B 3/16; A21B 5/02; A47J 37/0786; A47J 37/0611
(Continued)

(56) References Cited

U.S. PATENT DOCUMENTS 2,542,265 A    2/1951    Staples
3,416,509 A    12/1968    Huebler et al.
(Continued)

FOREIGN PATENT DOCUMENTS

DE    2427149 A1    12/1975
DE    3839447 A1    4/1989
(Continued)

OTHER PUBLICATIONS

International Search Report for application PCT/US2014/022571, dated Oct. 28, 2014, 5 pages.
(Continued)

*Primary Examiner* — Thien S Tran
(74) *Attorney, Agent, or Firm* — Cantor Colburn LLP

(57) ABSTRACT

A cooking apparatus includes a base including a lower heating plate an upper heating unit including an upper heating plate and a cleaning structure configured to move a cleaning blade along at least one of the lower heating plate and the upper heating plate. The apparatus also includes a control circuit configured to control movement of the cleaning blade across the one of the lower heating plate and the upper heating plate.

19 Claims, 6 Drawing Sheets

(51) Int. Cl.
  *A21B 3/16* (2006.01)
  *A47J 37/06* (2006.01)
  *A21B 5/02* (2006.01)

(58) Field of Classification Search
  USPC .......... 99/279, 281, 348, 349, 468; 426/231, 426/289, 523
  See application file for complete search history.

(56) References Cited

U.S. PATENT DOCUMENTS

| | | | |
|---|---|---|---|
| 4,274,331 A | | 6/1981 | Jensen et al. |
| 4,339,993 A | | 7/1982 | Lee |
| 4,345,514 A | * | 8/1982 | Morley ................ A47J 37/046 |
| | | | 99/349 |
| 4,393,758 A | | 7/1983 | Anmahian |
| 4,486,911 A | | 12/1984 | Beke |
| 4,700,617 A | * | 10/1987 | Lee ......................... A47J 27/14 |
| | | | 134/115 R |
| 4,922,435 A | | 5/1990 | Cahlander et al. |
| 4,979,255 A | * | 12/1990 | Buchnag ............ A47J 37/0786 |
| | | | 15/256.5 |
| 5,172,328 A | * | 12/1992 | Cahlander ............... A47J 27/14 |
| | | | 700/112 |
| 6,843,166 B1 | * | 1/2005 | Li ............................ A47J 27/14 |
| | | | 99/327 |
| 7,001,626 B2 | | 2/2006 | Sands et al. |
| 7,421,943 B1 | * | 9/2008 | Temesgen ................ A21B 5/00 |
| | | | 198/468.6 |
| 2005/0193901 A1 | | 9/2005 | Buehler |
| 2008/0141997 A1 | | 6/2008 | Druin |
| 2010/0229729 A1 | * | 9/2010 | Garcia .................... A47J 31/60 |
| | | | 99/281 |

FOREIGN PATENT DOCUMENTS

| | | |
|---|---|---|
| DE | 19817504 A1 | 10/1999 |
| DE | 202011001968 U1 | 3/2011 |
| EP | 0310093 A1 | 4/1989 |
| EP | 0455477 A2 | 11/1991 |
| EP | 1486264 A1 | 12/2004 |
| EP | 1762164 A1 | 3/2007 |
| WO | 2007103559 A2 | 9/2007 |
| WO | 2014144335 A1 | 9/2014 |

OTHER PUBLICATIONS

Written Opinion for application PCT/US2014/022571, dated Oct. 28, 2014, 7 pages.

PCT International Preliminary Report on Patentability; International Application No. PCT/US2014/022571; International Filing Date: Mar. 10, 2014; dated Sep. 15, 2015, pp. 1-8.

* cited by examiner

AUTOMATED CLEANING OF COOKING APPARATUS

BACKGROUND OF THE INVENTION

Embodiments of the invention relate to a cooking apparatus, and in particular to a cooking apparatus having an automated cleaning assembly to clean a surface of the cooking apparatus.

Grills for cooking apply heat from a lower heating plate and from an upper heating plate to opposite sides of a food item to decrease cook times and to cook food evenly. In conventional systems, an operator must lift the upper heating plate and manually scrape and clean the upper heating plate and the lower heating plate. Cleaning the plates may require that a user lean over the lower heating plate, which may require waiting until the heating plates cooled prior to cleaning the plates, or, if the plates are not cool, may result in accidental injury to a user.

BRIEF DESCRIPTION OF THE INVENTION

Embodiments of the present invention include a cooking apparatus that includes a base including a lower heating plate an upper heating unit including an upper heating plate and a cleaning structure configured to move a cleaning blade along at least one of the lower heating plate and the upper heating plate. The apparatus also includes a control circuit configured to control movement of the cleaning blade across the one of the lower heating plate and the upper heating plate.

Embodiments of the invention further include a method including receiving, by a control circuit, a command to perform a cleaning operation of a cooking apparatus, where the cooking apparatus has an upper heating unit and a base, the upper heating unit has an upper heating plate, and the base has a lower heating plate. The upper and lower heating plates are configured to heat opposite sides of a food product. The method further includes controlling, by the control circuit, a cleaning structure to move a cleaning blade across at least one of the upper heating plate and the lower heating plate.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Conventional grilling apparatuses require an operator to raise and lower an upper heating unit for cooking and cleaning. Embodiments of the invention relate to an automatic cleaning device to clean grilling or cooking surfaces.

Figure 1:
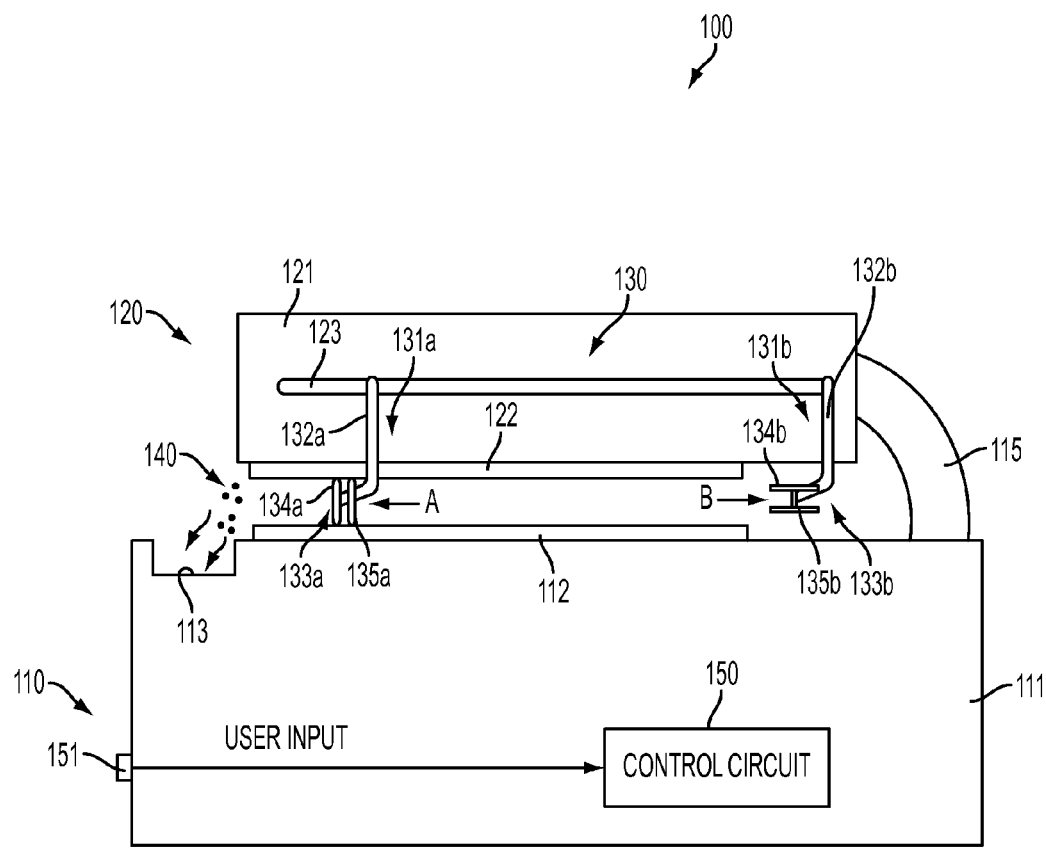
FIG. 1 illustrates a cooking apparatus according to one embodiment of the invention.

FIG. 1 illustrates a cooking apparatus 100 according to an embodiment of the invention. In one embodiment, the cooking apparatus 100 is a grilling apparatus for grilling food. The cooking apparatus 100 includes a base 110 including a housing 111 that rests on the ground, floor or another surface. The base 110 also includes a first heating plate 112, which may be referred to as a lower heating plate 112. The cooking apparatus 100 also includes an upper heating unit 120 including a housing 121 and an upper heating plate 122.

In FIG. 1, one configuration of a cooking apparatus 100 is illustrated including a single heating plate 112 on a housing 111 and a single upper heating unit 120. However, embodiments of the invention encompass any configuration of base 110, lower heating plate 112, upper heating unit 120 and upper heating plate 122, including multiple lower or upper heating plates or multiple upper heating units 120.

The upper heating unit 120 may be lifted from the base 110 by the lifting structure 115, which may include a hinge to permit angular lifting and bearings or other linear-movement structures to permit the upper heating unit 120 to move linearly with respect to the base 110. The lifting structure 115 may be fixed with respect to the base 110, as illustrated in FIG. 1, or the upper heating unit 120 may be suspended from a fixed structure above the upper heating unit 120.

The cooking apparatus 100 includes a cleaning structure 130 including a track 123 and moving structure 131. The moving structure 131 includes an arm 132 connecting a blade assembly 133 to the track 123. The blade assembly 133 includes a scraper 134 and a squeegee 135. FIG. 1 illustrates the moving structure in a cleaning position, represented by the moving structure 131a and a non-cleaning position 131b. Similarly, the arm 132a, blade assembly 133a, scraper 134a and squeegee 135a are illustrated in the cleaning position, while the arm 132b, blade assembly 133b, scraper 134b and squeegee 135b are illustrated in the non-cleaning position.

In operation, the moving structure 131a moves across the upper heating plate 122 and the lower heating plate 112 in the cleaning direction A, from a rear of the upper and lower heating plates 122 and 112 to a front of the upper and lower heating plates 122 and 112. As the moving structure 131 moves across the heating plates 112 and 122, the scraper 134 scrapes, and the squeegee 135 cleans, the food product remnants, oil, and other cooking by-products 140 into a recess or trough 113 formed in the base 110. Upon completion of cleaning, the blade assembly 133 may be rotated ninety degrees, or any other angle that moves the blades 134 and 135 away from the upper and lower heating plates 122 and 112. The moving structure 131 may then move in the direction B from the front of the heating plates 112 and 122 to the rear of the heating plates 112 and 122 to the non-cooking position, represented by 131b.

In embodiments of the invention, the control circuit 150, which may include a processor, memory and other control circuitry to control the cleaning structure 130. The control circuit 150 may initiate a cleaning operation based on receiving a user input signal from the user input 151, which may be a button, switch, or any other user-actuated device. Alternatively, the control circuit 150 may initiate the cleaning operation based on detecting a predetermined condition. In one embodiment, the predetermined condition includes detecting that one or both of the heating plates 112 and 122 is at a predetermined temperature, such as heated to a predetermined temperature above a cooking temperature or cooled to a predetermined temperature below a cooking temperature. In another embodiment, the predetermined condition includes a set time after an end of a cooking operation. In another embodiment, the predetermined condition includes a combination of detecting that the upper heating plate 122 is brought down to be substantially parallel to the lower heating plate 112, to be a distance corresponding to an end-to-end size of the blade assembly 133 and one or both of the predetermined temperature and the set time.

Figure 2:
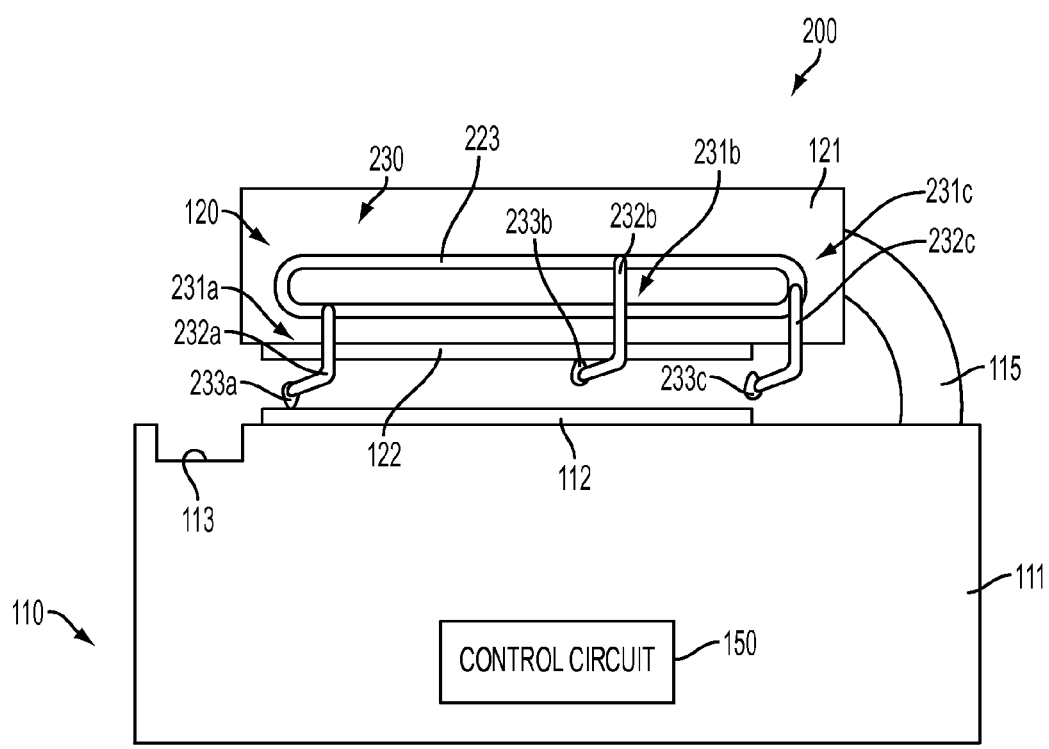
FIG. 2 illustrates a cooking apparatus according to another embodiment of the invention.

FIG. 2 illustrates an example of a cooking apparatus 200 according to another embodiment of the invention. The cooking apparatus 200 is similar to the cooking apparatus 100 of FIG. 1, except that the cleaning structure 230 includes a track 223 having a loop structure, and the moving structure 231 includes an arm 232 and a blade 233, where the blade 233 is configured to clean only one of the lower heating plate 112 and the upper heating plate 122 at a time. The track 223 may be a groove in the housing 121 of the upper heating unit 120, or the track 223 may be a chain, belt or other structure configured to guide the arm 232 along a predetermined path to permit the blade 233 to clean the lower heating plate 112 and the upper heating plate 122.

FIG. 2 illustrates the moving structure 231 in three positions corresponding to different stages of a cleaning process and a non-cleaning process. The moving structure 231a, including the arm 232a and blade 233a represent a cleaning position where the blade 233 is cleaning the lower heating plate 112; the moving structure 231b, including the arm 232b and blade 233b represent a cleaning position where the blade 233 is cleaning the upper heating plate 122; and the moving structure 231c, including the arm 232c and blade 233c represent a non-cleaning position.

Figure 3:
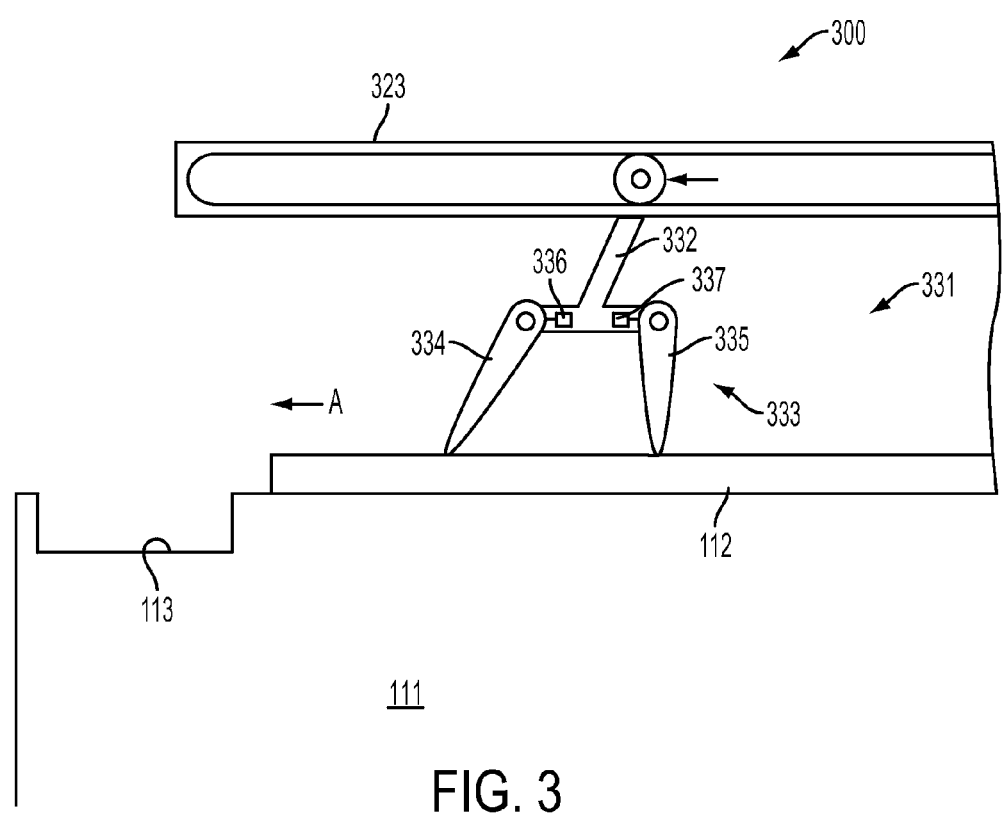
FIG. 3 illustrates a cooking apparatus according to another embodiment of the invention.

FIG. 3 illustrates a cleaning structure 300 according to one embodiment of the invention. The cleaning structure 300 includes a track 323 and moving structure 331. The moving structure 331 includes an arm 332 connecting a blade assembly 333 to the track 323. The blade assembly 333 includes a scraper 334 and a squeegee 335. In one embodiment, the scraper 334 is a hard, stiff plastic or polymer, or metal, configured to scrape burnt carbon by-products from the lower heating plate 112 and the squeegee 335 is a flexible rubber or polymer configured to pick up or push loose particulates and fluids along the lower heating plate 112.

The moving structure 331 may also include actuation mechanisms 336 and 337. The actuation mechanisms 336 and 337 may be electronically-controlled actuators capable of receiving commands to change a position of the scraper 334 and squeegee 335, such as to move the scraper 334 and squeegee 335 from a cleaning position to a non-cleaning position apart from the lower heating plate 112. Alternatively, the actuation mechanisms 336 and 337 may be passive actuators, such as springs, to cause the scraper and squeegee to maintain a force against the lower heating plate 112 according to the force generate by the actuation mechanisms 336 and 337.

Although omitted from FIG. 3 for purposes of clarity, the moving structure 331 may also include additional actuation mechanisms to alter an angle of the arm 332, or the actuation mechanisms 336 and 337 may each include multiple actuators, such as a linear actuator in combination with a spring.

In operation, moving structure 331 moves in the direction A in a cleaning operation so that the scraper 334 scrapes burnt carbon by-products off of the lower heating plate 112 and the squeegee 335 follows the scraper 334 to clean loose particulates and fluids off of the heating plate 112. Each of the scraper 334 and the squeegee 335 may push the respective cooking by-products into the trough 113.

Although only the lower heating plate 112 is illustrated in FIG. 3, it is understood that the scraper 334 and squeegee 335 may be configured to scrape and squeegee an upper heating plate 122 in addition to the lower heating plate 112. In one embodiment, the scraper 334 includes only a single blade extending to the lower heating plate 112, while the squeegee 335 includes two blades, one extending to the lower heating plate 112 and one extending to an upper heating plate 122. This may be an ideal configuration for food products that do not leave burnt food by-products on the upper heating plate 122, for example.

In one embodiment, the track 323 is a ridge formed in a housing 121 of an upper heating unit 120. Alternatively, the moving structure 331 may be moved by a chain, belt or other moving device. In one embodiment, the track 323 is located in a structure that is separate from the upper heating unit 120 of FIG. 1. For example, after a cooking operation, the upper heating unit 120 may be lifted away from the base 110, and a cleaning structure including the track 323 and moving structure 331 may be pivoted or lowered to a cleaning position on the lower heating plate 112.

Figure 4:
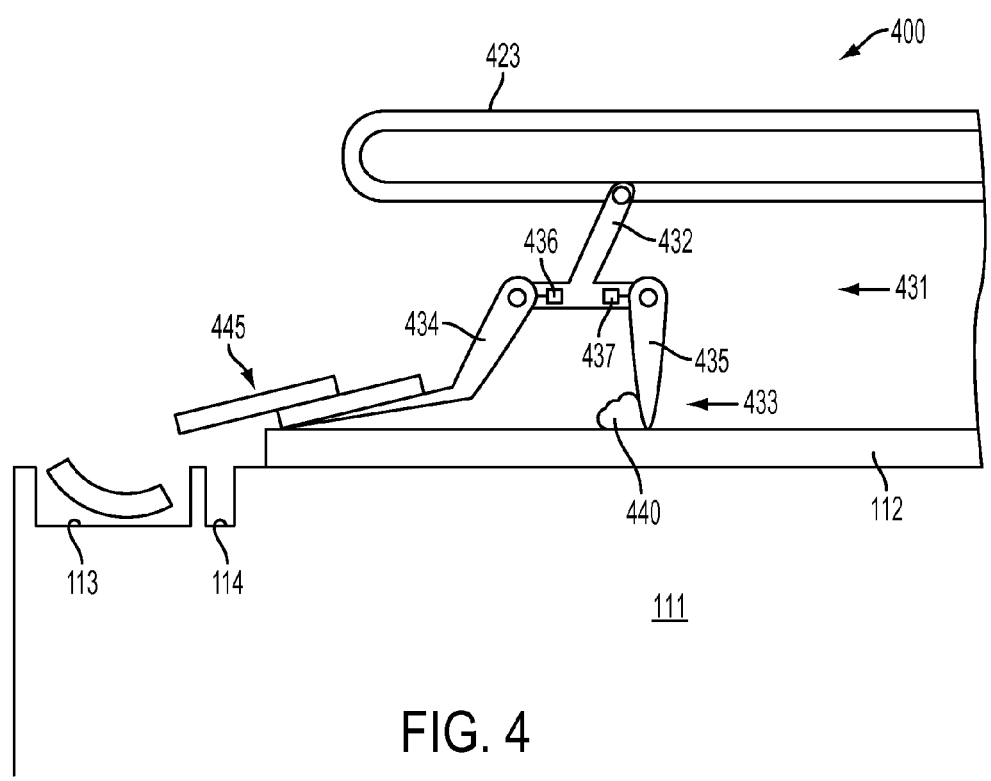
FIG. 4 illustrates a portion of a cleaning structure according to one embodiment of the invention.

FIG. 4 illustrates a cleaning structure 400 according to one embodiment of the invention. The cleaning structure 400 includes a track 423 and moving structure 431. The moving structure 431 includes an arm 432 connecting a blade assembly 433 to the track 423. The blade assembly 433 includes a food product lifting blade 434 and a squeegee 435. In one embodiment, the food product lifting blade 434 is configured at an acute angle relative to the lower heating plate 112 to be able to lift food off of the lower heating plate 112.

The moving structure 431 may also include actuation mechanisms 436 and 437. The actuation mechanisms 436 and 437 may be electronically-controlled actuators capable of receiving commands to change a position of the food product lifting blade 434 and squeegee 435, such as to move the food product lifting blade 434 and squeegee 435 from a cleaning position to a non-cleaning position apart from the lower heating plate 112. Alternatively, the actuation mechanisms 436 and 437 may be passive actuators, such as springs, to cause the food product lifting blade 434 and squeegee 435 to maintain a force against the lower heating plate 112 according to the force generate by the actuation mechanisms 436 and 437.

Although omitted from FIG. 4 for purposes of clarity, the moving structure 431 may also include additional actuation mechanisms to alter an angle of the arm 432, or the actuation mechanisms 436 and 437 may each include multiple actuators, such as a linear actuator in combination with a spring.

In operation, moving structure 431 moves in the direction A in a cleaning operation so that the food product lifting blade 434 lifts food product 445 to deposit the food product in a trough 113 and the squeegee 435 follows the food product lifting blade 434 to clean food by-products 440, such as loose particulates and fluids, off of the lower heating plate 112. In one embodiment, the squeegee 435 leaves the loose food by-products 440 at an edge of the lower heating plate 112. In the embodiment illustrated in FIG. 4, the base 111 includes a first trough 114 adjacent to the lower heating plate 112 and a second trough 113 farther from the lower heating plate 112. The food product lifting blade 434 deposits the food product 445 in the second trough 113 and the squeegee 435 deposits the food by-product 440 in the first trough 114.

Although only the lower heating plate 112 is illustrated in FIG. 4, it is understood that the squeegee 335 may be configured to clean an upper heating plate 122 in addition to the lower heating plate 112. In one embodiment, the track 323 is a ridge formed in a housing 121 of an upper heating unit 120. Alternatively, the moving structure 431 may be moved by a chain, belt or other moving device. In one embodiment, the track 323 is located in a structure that is separate from the upper heating unit 120 of FIG. 1. For example, after a cooking operation, the upper heating unit 120 may be lifted away from the base 110, and a cleaning structure 400 including the track 423 and moving structure 431 may be pivoted or lowered to a cleaning position on the lower heating plate 112.

Figure 5:
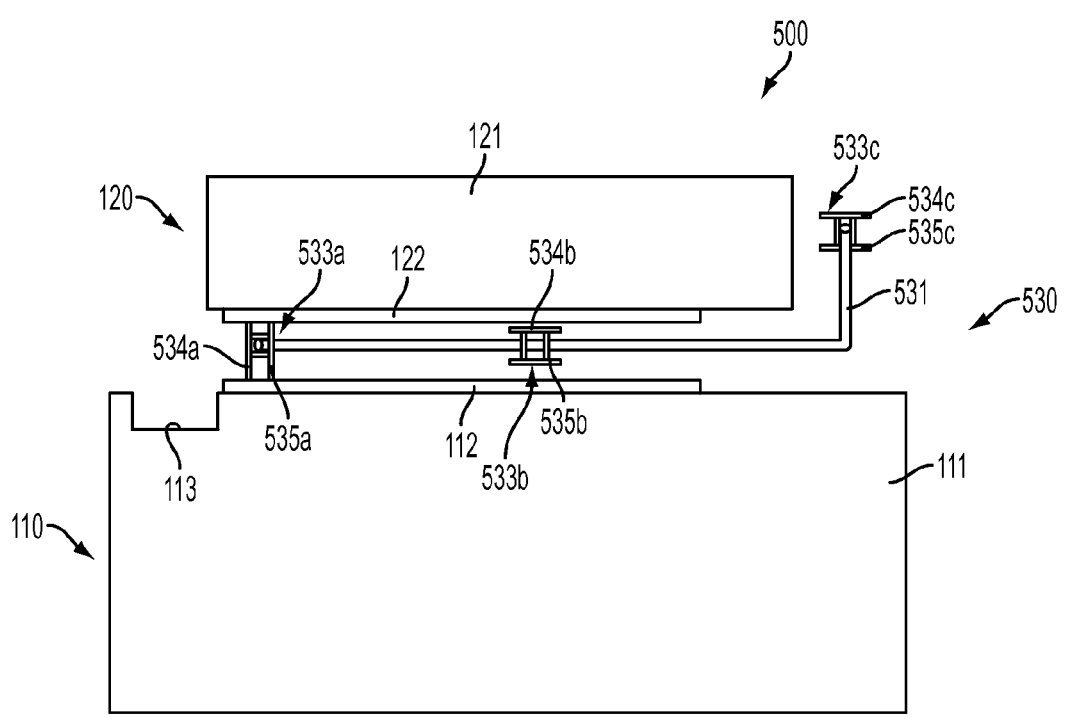
FIG. 5 illustrates a cooking apparatus according to another embodiment of the invention.

FIG. 5 illustrates a cooking apparatus 500 according to another embodiment of the invention. The cooking apparatus 500 is similar to the cooking apparatus 500 of FIG. 1, except that the cleaning structure 530 includes a track 531 that is a structure separate from the upper heating unit 120. The track 531 may be a bar, chain, belt or any other structure capable of moving the blade assembly 533 along the track 531. The cleaning structure 530 may have an end at the rear of the upper heating unit 120 that rotates to move the cleaning structure 530 to be positioned between the upper heating plate 122 and the lower heating plate 112.

In the embodiment illustrated in FIG. 5, the cleaning structure 530 may be inserted between the lower heating plate 112 and the upper heating plate 122 while the upper heating plate 122 is lowered to be substantially parallel to the lower heating plate 112. Alternatively, the upper heating unit 120 may be lifted to be separated from the base 110, the cleaning structure 130 may rotated and/or lowered onto the lower heating plate 112 and the upper heating unit 120 may be lowered again so that the upper heating plate 122 is spaced apart from the lower heating plate 112 at a distance corresponding to a length of the blades 534 and 535.

The blade assembly 533 includes a first blade 534 and a second blade 535. The first blade 534 and the second blade 535 may both be squeegees, or the first blade 534 may be a scraper and the second blade 535 may be a squeegee.

FIG. 5 illustrates the blade assembly 533 in three positions corresponding to different stages of a cleaning process and a non-cleaning process. The blade assembly 533a, including the blade 234a and the blade 235a represent a cleaning position where the blades 234 and 235 are simultaneously cleaning the lower heating plate 112 and the upper heating plate 122. The blade assembly 533b includes the blades 234b and 235b in a non-cleaning moving position. The blade assembly 533c includes the blades 234c and 235c in a stationary non-cleaning position.

Figure 6:
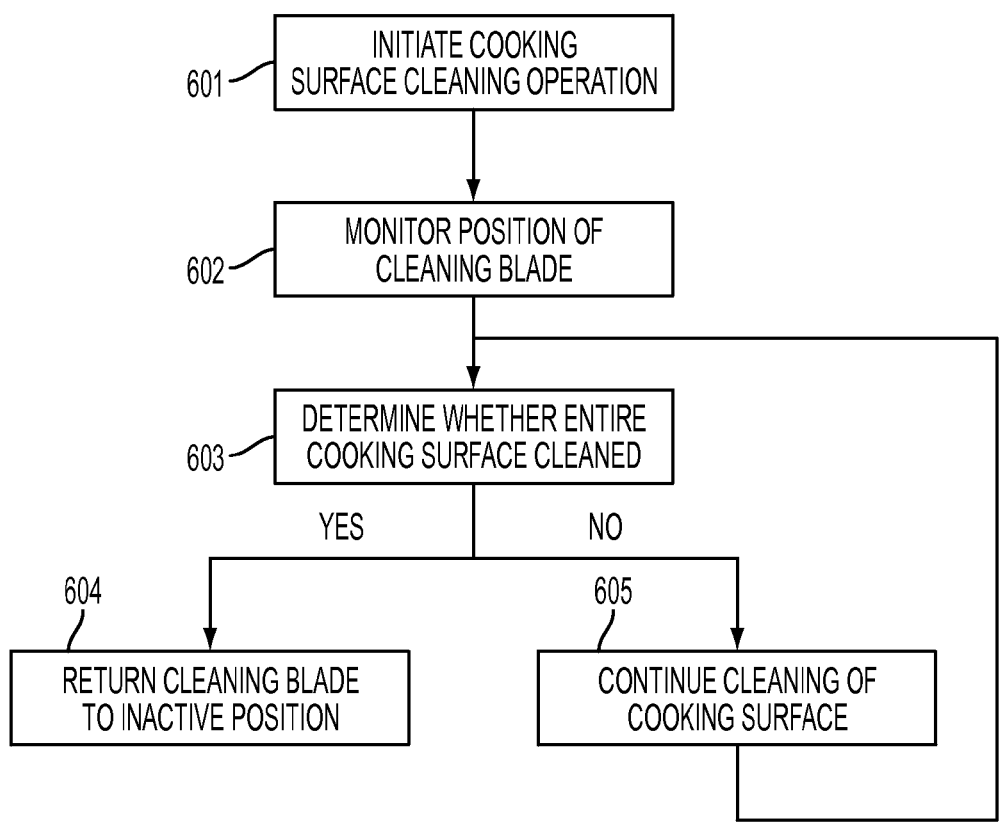
FIG. 6 is a flowchart of a method according to an embodiment of the invention.

FIG. 6 illustrates a flowchart of a method according to an embodiment of the invention. In block 601, a cleaning operation is initiated. The cleaning operation may be initiated to clean a cooking surface based on a user input, sensor input or a computer program. In one embodiment, a user initiates the cleaning operation by pressing a button, switch or other actuator. In another embodiment, sensors detect one or both of a position of an upper heating unit including an upper heating plate and a temperature of one or more heating plates. In another embodiment, a control circuit monitors a time from the end of a cooking operation and initiates a cleaning operation based on the measured time. In yet another embodiment, sensors detect a temperature of a food product to initiate removal of the food product and cleaning of the upper heating plate and lower heating plate. In yet another embodiment, sensors detect a heat flux of the upper and lower heating plates and initiate the cleaning and/or removal operations based on the detected heat flux. Alternative embodiments encompass any combination of the above conditions, including initiating cleaning at a predetermined time after a user command or after detecting a certain temperature of heating plates.

The cleaning operation is initiated by moving a cleaning blade into contact with a heating surface. In one embodiment, the cleaning blade is mounted to an upper heating unit of a cooking apparatus, and in another embodiment, the cleaning blade is mounted to a separate structure from the upper heating unit. In an embodiment in which the cleaning structure is separate from an upper heating unit, the cleaning structure may be lowered onto a lower heating plate or rotated around onto the lower heating plate from a side of the upper heating unit. In another embodiment, a cleaning blade may be brought into contact with an upper heating plate either separately or simultaneously with a cleaning blade being brought into contact with a lower heating plate.

In block 602, the position of a cleaning blade is monitored, such as by monitoring motor control signals or sensor signals. In block 603, it is determined whether the entire cleaning surface has been cleaned based on the detected position of the cleaning blade. If the entire heating surface has been cleaned, then in block 604, the cleaning blade is returned to an inactive position. For example, a blade may be moved from a cleaning position to a non-contact position by adjusting an angle of the blade and moving the blade to a stationary non-cleaning position. On the other hand, if it is determined in block 603 that the entire cooking surface has not been cleaned, then in block 605 the blade is controlled to continue cleaning the heating plate. For example, a motor may continue to run to move a belt, chain or wire to which a blade is mounted.

In embodiments of the invention, the process of initiating a cleaning operation, monitoring the cleaning operation and terminating the cleaning operation may be controlled by a control circuit, including processors, memory and other supporting circuitry configured to execute a computer program to control a cleaning structure of a cooking apparatus.

Embodiments of the invention encompass a cooking apparatus having an automatic cleaning function. The automatic cleaning function includes a cleaning blade to clean a cooking surface. Some embodiments encompass multiple cleaning blades to clean a same cleaning surface or opposing cleaning surfaces. Embodiments encompass cleaning upper and lower cleaning plates separately or simultaneously. Embodiments also encompass multiple cleaning blades, including a squeegee blade, scraper blade and food-lifting blade being connected to each other and moving together to perform different cleaning functions on a heating plate. According to embodiments of the invention, upper and lower heating plates may be cleaned simultaneously while facing each other by a blade having multiple edges, or the upper and lower heating plates may be cleaned separately while separated from each other.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A cooking apparatus, comprising:
a base including a lower heating plate;
an upper heating unit including an upper heating plate;
a cleaning structure including a track defining a path and a cleaning blade movable about the path defined by the track to clean only one of the lower heating plate and the upper heating plate at a time, wherein the track of the cleaning structure is mounted to one of the upper heating unit and a structure separate from the upper heating unit and the base; and
a control circuit configured to control movement of the cleaning blade across the one of the lower heating plate and the upper heating plate.

2. The cooking apparatus of claim 1, wherein the track extends a length of the at least one of the lower heating plate and the upper heating plate.

3. The cooking apparatus of claim 1, wherein the cleaning blade includes a first edge and a second edge opposite the first edge, the first edge and the second edge configured to simultaneously clean the lower heating plate and the upper heating plate, respectively while the upper heating plate is positioned substantially parallel to the lower heating plate.

4. The cooking apparatus of claim 1, wherein the cleaning structure includes a scraping blade to scrape food product remnants from the one of the lower heating plate and the upper heating plate.

5. The cooking apparatus of claim 4, wherein the cleaning blade is a squeegee and the scraping blade is connected to the squeegee to move co-linearly with the squeegee across the one of the lower heating plate and the upper heating plate.

6. The cooking apparatus of claim 1, wherein the cleaning structure includes a food product lifting blade connected to the cleaning blade to remove a food product from the lower heating plate as the cleaning blade moves across the lower heating plate.

7. The cooking apparatus of claim 1, wherein the cleaning blade is configured to move along a path defined by at least the track belt.

8. The cooking apparatus of claim 1, wherein the control circuit is configured to initiate a cleaning operation of the cleaning structure based on a user input.

9. The cooking apparatus of claim 1, wherein the control circuit is configured to initiate a cleaning operation of the cleaning structure based on detecting that a cooking operation is completed.

10. The cooking apparatus of claim 1, wherein:
the control circuit is configured to move the cleaning blade as part of a cleaning operation in response to receive a command.

11. The cooking apparatus of claim 10, wherein the command to perform a cleaning operation is generated by a user input on the cooking apparatus.

12. The cooking apparatus of claim 10, wherein the command to perform a cleaning operation is generated by a control program of the control circuit based on detecting a termination of a cooking operation.

13. The cooking apparatus of claim 12, wherein the command to perform the cleaning operation is generated a predetermined period of time after termination of the cooking operation.

14. The cooking apparatus of claim 12, wherein the command to perform the cleaning operation is generated based on detecting that the one of the lower heating plate and the upper heating plate is at a predetermined temperature.

15. The cooking apparatus of claim 10, wherein the cleaning operation includes moving the upper heating plate to be substantially parallel to the lower heating plate while the cleaning blade moves across the at least one of the lower heating plate and the upper heating plate.

16. The cooking apparatus of claim 15, wherein the cleaning blade includes a first edge and a second edge opposite the first edge, the first edge configured to clean the upper heating plate while the second edge cleans the lower heating plate.

17. The cooking apparatus of claim 10, wherein the cleaning structure includes a cleaning arm extending between the track, belt or chain and the cleaning blade, and
the cleaning operation includes moving the cleaning blade across the at least one of the upper and lower heating plates includes moving the cleaning arm along the track, belt or chain.

18. The cooking apparatus of claim 10, wherein:
the control unit is configured to:
determine that the upper heating plate is lifted to a non-cooking position away from the lower heating plate; and
control the cleaning structure to move the cleaning blade across the at least one of the upper and lower heating plates based on the determining that the upper heating plate is lifted to a non-cooking position away from the lower heating plate.

19. The cooking apparatus of claim 10, wherein the cleaning structure includes a food product lifting blade and the cleaning blade connected to each other,
the cleaning structure moves the cleaning blade across at least the lower heating plate, and
the cleaning structure moves each of the food product lifting blade and the cleaning blade together across the lower heating plate, such that the food product lifting blade lifts a food product off of the lower heating plate prior to the cleaning blade cleaning the lower heating plate.

* * * * *